United States Patent
Yuan et al.

(10) Patent No.: US 6,178,163 B1
(45) Date of Patent: Jan. 23, 2001

(54) OPTIMAL PACKET ROUTING METHOD AND SYSTEM FOR LOW EARTH ORBIT SATELLITE COMMUNICATION SYSTEM

(75) Inventors: Wei Yuan, Plano; Sairam Subramanian, Dallas, both of TX (US)

(73) Assignee: Northern Telecom Limited, Montreal (CA)

( * ) Notice: Under 35 U.S.C. 154(b), the term of this patent shall be extended for 0 days.

(21) Appl. No.: 09/210,430

(22) Filed: Dec. 11, 1998

(51) Int. Cl.⁷ .................................................... H04B 7/212

(52) U.S. Cl. ............................................. 370/323; 370/393

(58) Field of Search ..................................... 370/323, 325, 370/349, 393

(56) References Cited

U.S. PATENT DOCUMENTS

| | | | |
|---|---|---|---|
| 5,870,377 | * 2/1999 | Hayashida | 370/323 |
| 5,907,541 | * 5/1999 | Fairholm et al. | 370/323 |
| 5,924,014 | * 7/1999 | Vanden Heuvel et al. | 370/323 |
| 5,982,756 | * 11/1999 | Hayashida | 370/323 |

FOREIGN PATENT DOCUMENTS 9707832   4/1997  (GB) .

OTHER PUBLICATIONS

Markus Werner, et al., "ATM–Based Routing in LEO/MEO Satellite Networks with Intersatellite Links," IEEE Journal on selected Areas in Communications, vol. 15, No. 1, Jan. 1997.

* cited by examiner

Primary Examiner—Salvatore Cangialosi
(74) Attorney, Agent, or Firm—Haynes and Boone, LLP

(57) ABSTRACT

In a LEO satellite system with the implementation of a virtual network, a method and a system are proposed for arranging an optimal route for data packets to travel. The method and system will diversify the traffic between satellites, and accordingly enhance the efficient use of the entire satellite system. An intermediary satellite is first selected between a source satellite and a destination satellite. Further, an optimal route is found among a plurality of shortest paths between the source satellite and the intermediary satellite, and subsequently another optimal route is found between the intermediary satellite and the destination satellite. Once an optimal route is determined, the route information can be encoded in the header segment of data packets. The data packets will travel from the source satellite, via the intermediary satellite, and eventually to the destination satellite without requiring any satellite to transfer routing tables, and without unnecessarily over burdening the traffic along the way between the source satellite and the destination satellite. By doing so, more communication connections can be made for billable wireless services. Moreover, a randomized selection of an intermediary satellite provides an optimal route, and consequently reduces, if not eliminates, the need for traffic congestion control.

39 Claims, 6 Drawing Sheets

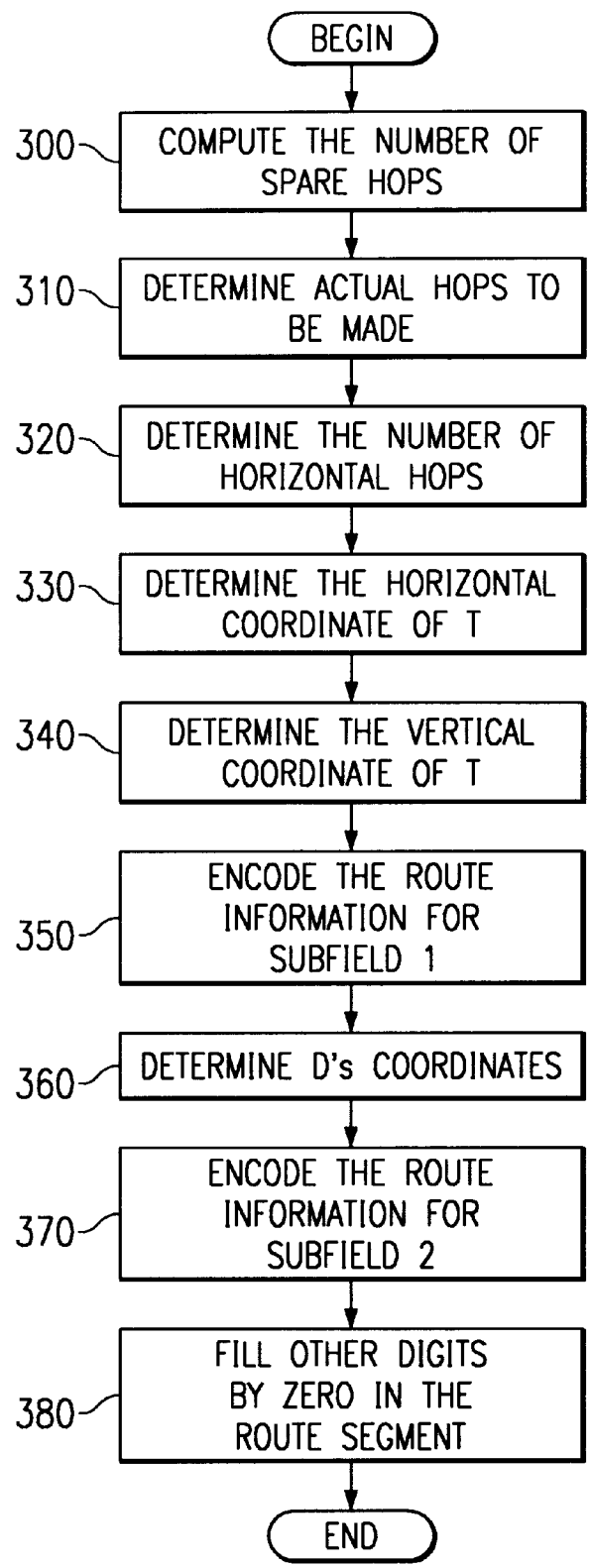

OPTIMAL PACKET ROUTING METHOD AND SYSTEM FOR LOW EARTH ORBIT SATELLITE COMMUNICATION SYSTEM

TECHNICAL FIELD

The present disclosure relates generally to mobile satellites and terrestrial wireless communication systems, and more particularly, to a routing method and system for enabling a Low Earth Orbit satellite communication system to efficiently transfer data packets among satellites for a continuous wireless service.

BACKGROUND OF THE INVENTION

In the modern satellite telecommunication industry, the Low Earth Orbit (LEO) satellite system is considered as one of the alternatives to the Geostationery satellite system for providing global wireless services. The significantly small round trip time delay between a ground station on earth and a satellite, i.e. about 14 mili-seconds, and low power consumption for transferring radio frequency signals, such as packets, have proved to be distinctive advantages. In order to achieve a global coverage, a LEO satellite system may have over a hundred satellites rotating around the earth. FIG. 1 depicts such a global LEO satellite system 10.

Turning now to FIG. 2, each satellite 12 of a LEO satellite system will have a footprint 14. The footprint is a spherical coverage area on the surface of the earth that a satellite can cover. However, in order to eliminate redundant coverage in an overlapping area 16 of neighboring footprints, each covering satellite will only have a smaller responsible region 18 within its respective footprint. Accordingly, the surface of the earth is divided into a number of fixed responsible regions, the size of which being determined by the total number and the physical positions of satellites in a particular LEO satellite system.

A major problem of LEO satellite systems is that the satellites move around the earth at a speed much faster than the speed of the earth's rotation. The faster speed of the satellites is required in order for the satellites to be kept in a particular orbit, and therefore, at a particular position on the earth. As a result, wireless telecommunication services are handled by different covering satellites at different times. For example, with a LEO satellite system in a 1500 km orbit, the moving speed of satellite units is on the order of 6.35 km/sec (i.e., about 4 miles/sec). Consequently, a particular geographical location on the earth will have a change in its covering satellite about once every eight (8) minutes.

In order to have continuous wireless services in a particular geographic location on the earth, an incoming covering satellite must take over prescribed information about its new responsible region from an outgoing covering satellite. This is required in order not to interrupt any ongoing wireless service. For example, a mobile phone user may be talking on the phone while a corresponding covering satellite moves out from the responsible region or coverage area. Another satellite moves in to cover the same area, however, if the new satellite does not obtain information about the ongoing phone call, the user will be undesirably disconnected. To avoid this problem, information is exchanged between outgoing and incoming satellites through wireless communication connections between them known as inter-satellite links 20, for example, as shown in FIG. 2.

Due to technical limitations, at any specific time, a satellite may only have connections with at least one satellite north of it, another one south of it, two satellites west of it, and two more satellites east of it. For illustration purposes herein, each LEO satellite of the LEO satellite system is assumed to have only four such inter-satellite links to its neighboring satellites, as shown in a two dimensional view of FIG. 3. Take a particular wireless service such as a long-distance phone call as an example, it is likely to be one that intends to reach a location outside of the responsible region for a particular covering satellite. For the long-distance call, packets are sent through multiple inter-satellite links to reach a covering satellite over the final destination, to be received by a receiver of the long-distance call. Traditionally, identifications of those satellites and the route for the packets are stored in each of the covering satellites, both for the caller and the receiver, in the form of a routing table. When there is a transition between two covering satellites for the caller, this routing table must be transferred from the outgoing covering satellite to the incoming one. The size of a routing table for a responsible region can be very large, for example, on the order of about 3 kilo bytes. Since there is always a bandwidth limitation on inter-satellite links, frequently passing of routing tables between satellites consumes valuable bandwidth of the inter-satellite links (i.e., congests messaging traffic), and as a result, prevents other services, such as billable phone calls, from going through. A traffic congestion control mechanism can be installed to mitigate this effect, however, the cost to maintain the LEO satellite system increases, and at the same time, the overall capacity of the system is reduced.

In order to find a feasible alternative to the frequent information exchange between satellites, a virtual network and virtual routing method is proposed in a co-pending application UK Patent No. 9,707,832, incorporated herein by reference. Consistent with the concept of a virtual network, as FIG. 4 illustrates, the surface of the earth 22 is divided into a fixed number of virtual regions, each region being called a node 24. Each region or node has the same size as a responsible region as determined by a LEO satellite system. Similar to the inter-satellite links, each node is assumed to be linked to four immediately adjacent nodes, for example, as indicated by reference numeral 26. Because of the constant rotation of the satellites with respect to the earth, a satellite's responsible region is likely to cover a portion or part of multiple virtual nodes. If more than one quarter of the total area of a node is covered by a given satellite, then the given satellite is defined as a primary satellite to that node. For example, as shown in FIG. 5, the virtual network 22 is defined by a grid system with continuous lines, while the actual responsible regions 18 are represented by a grid system with dotted lines. Therefore, by definition, since the unit sizes of these two systems are the same, only one primary satellite exists at any time for a particular node. For example, Satellite "q" is a primary satellite for Node "Q".

In co-pending patent UK Patent No. 9,707,832, a method is disclosed for finding a path between any two nodes in a virtual network, and then mapping this path to an actual satellite network to eliminate the need for passing routing tables between satellites. However, even utilizing the framework of a virtual network, wherein a shortest path for routing data packets is determined between any two satellites, undesired traffic congestion can still be triggered unexpectedly between the satellites if a normal shortest path algorithm is used. The undesired traffic congestion occurs because numerous wireless services will be taking the same shortest route between these satellites which leads to saturation of the bandwidth. Another disadvantage of using a normal shortest path algorithm is that since only the capacities of satellites on the route are used, other satellites in the entire satellite system cannot be taken advantage of or used, even if they are idle with no current service operations.

SUMMARY OF THE INVENTION

What is needed in a LEO satellite system with the implementation of a virtual network is a method to arrange an optimal route for data packets to travel, and to diversify the traffic between satellites, thus to enhance the efficient use of the entire satellite system. In order to achieve this goal, a satellite is randomly selected first as an intermediary satellite between a source satellite and a destination satellite, i.e., between a satellite which covers the region where the phone call is initiated and a satellite which covers the region where the phone call is received, respectively. An optimal route is then found between the source satellite and the intermediary satellite, and subsequently another optimal route between the intermediary satellite and the destination satellite. Once the optimal routes are determined, the route information can be kept in the header segment of a packet. The packet will travel from the source satellite, through the intermediary satellite, to the destination satellite without requiring the satellites to transfer routing tables, and without unnecessarily over burdening the traffic along the way between the source satellite and the destination satellite. By doing so, more satellites in a LEO satellite system can potentially be put into efficient use, and more communication connections can be made for billable wireless services. Moreover, due to the nature of the randomized selection of an intermediary satellite, the determination of the optimal route from the source satellite to the destination satellite reduces, if not eliminates, the need for traffic congestion control.

BRIEF DESCRIPTION OF THE DRAWINGS

The foregoing and other teachings and advantages of the present disclosure will become apparent upon a detailed description of the best mode for carrying out the invention as rendered below. In the description to follow, reference will be made to the accompanying drawings, in which:

FIG. 10 is a flow chart illustrating the method for determining an appropriate intermediary satellite and randomly selecting an optimal route in accordance with an embodiment of the present disclosure.

DETAILED DESCRIPTION OF A PREFERRED EMBODIMENT

For illustration purposes of this disclosure, connections between nodes in the virtual network on the earth are functionally identical to links between satellites in the orbit.

Figure 1:
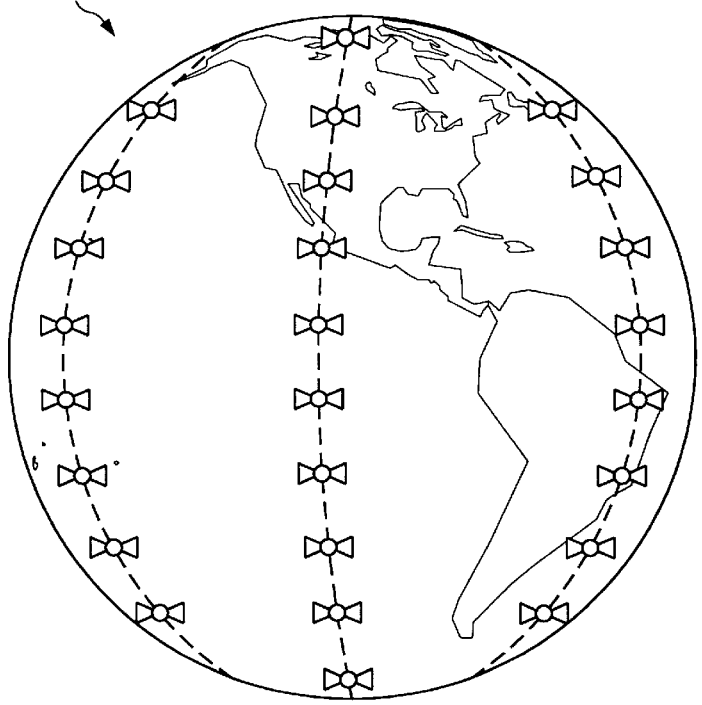
FIG. 1 depicts a LEO satellite system with global coverage.
Figure 2:
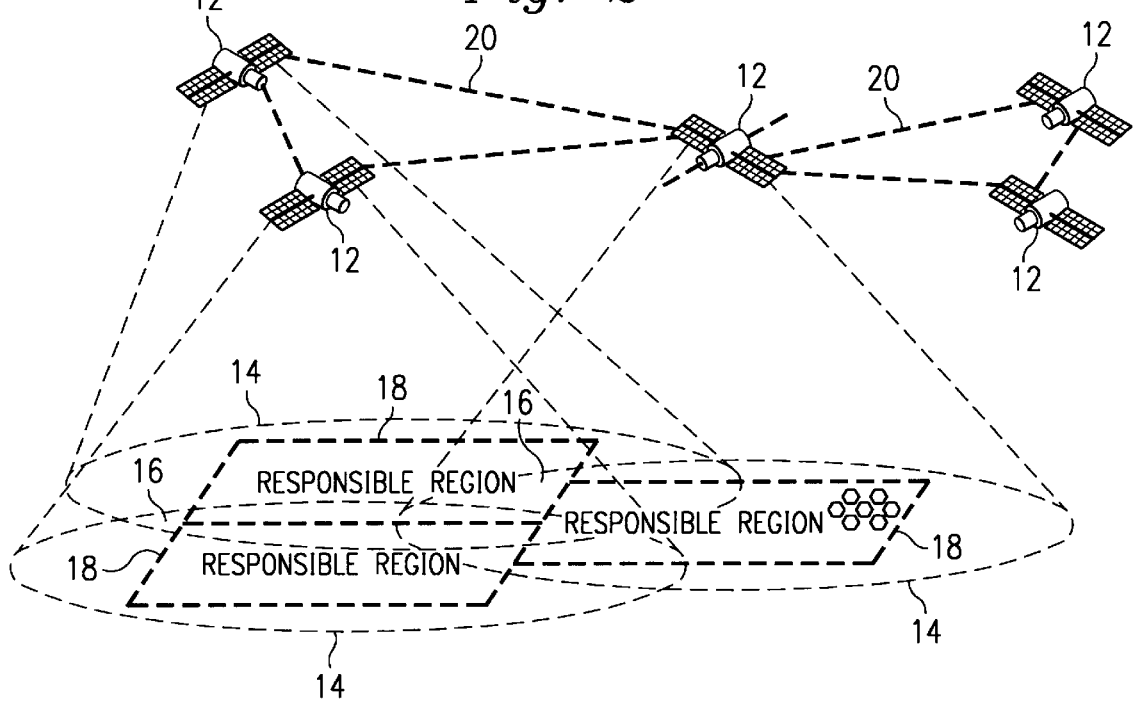
FIG. 2 is a three dimensional view of several satellites and their respective footprints on the earth, responsible regions, and exemplary inter-satellite links with neighboring satellites.
Figure 3:
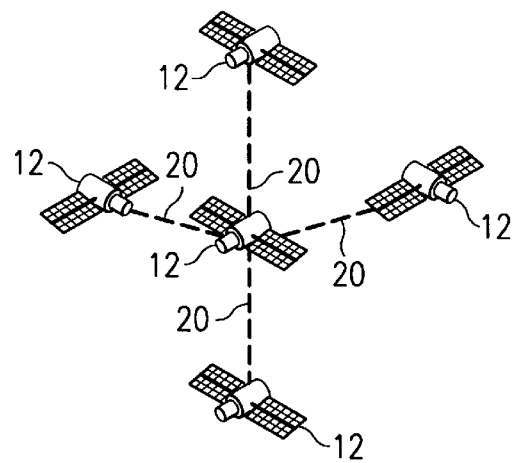
FIG. 3 is a two dimensional view of a satellite with four inter-satellite links with a respective satellite to the north, south, east and west of its location.
Figure 4:
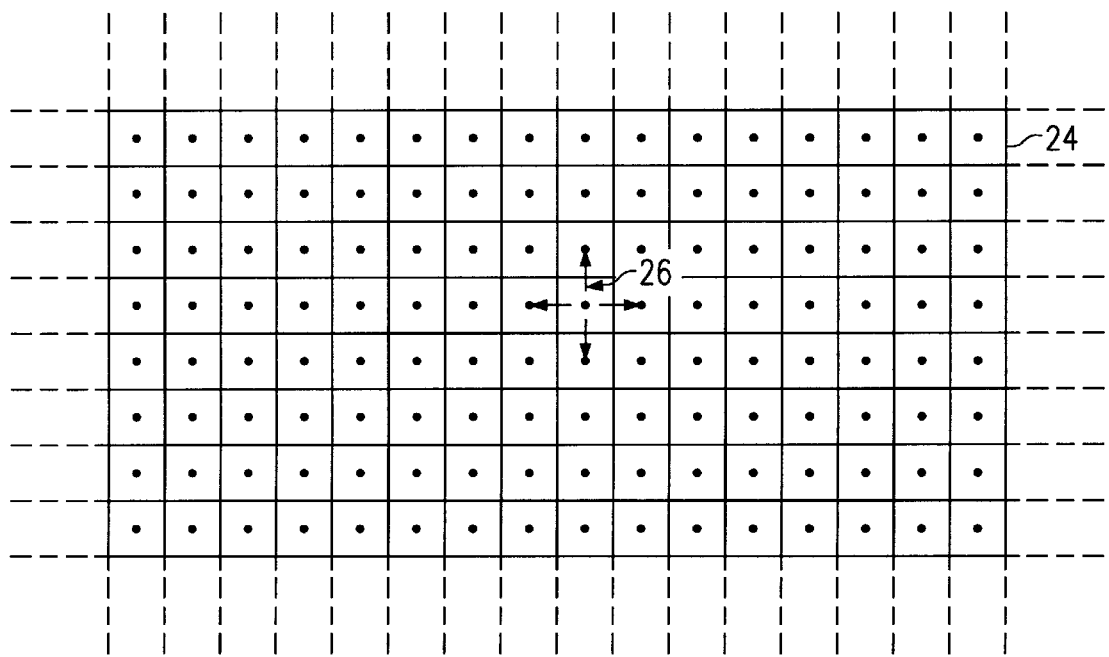
FIG. 4 is a plenary graphic representation of a virtual network of neighboring nodes having connections among them.
Figure 5:
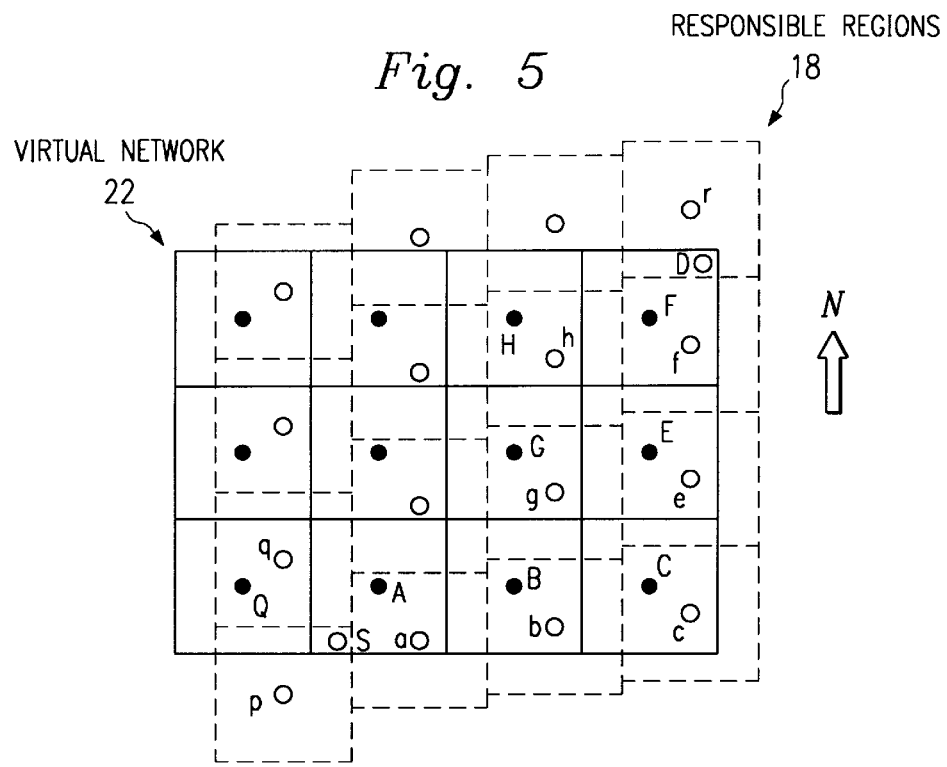
FIG. 5 is a view of a virtual network with virtual nodes overlapping responsible regions of an actual LEO satellite system.
Figure 6:
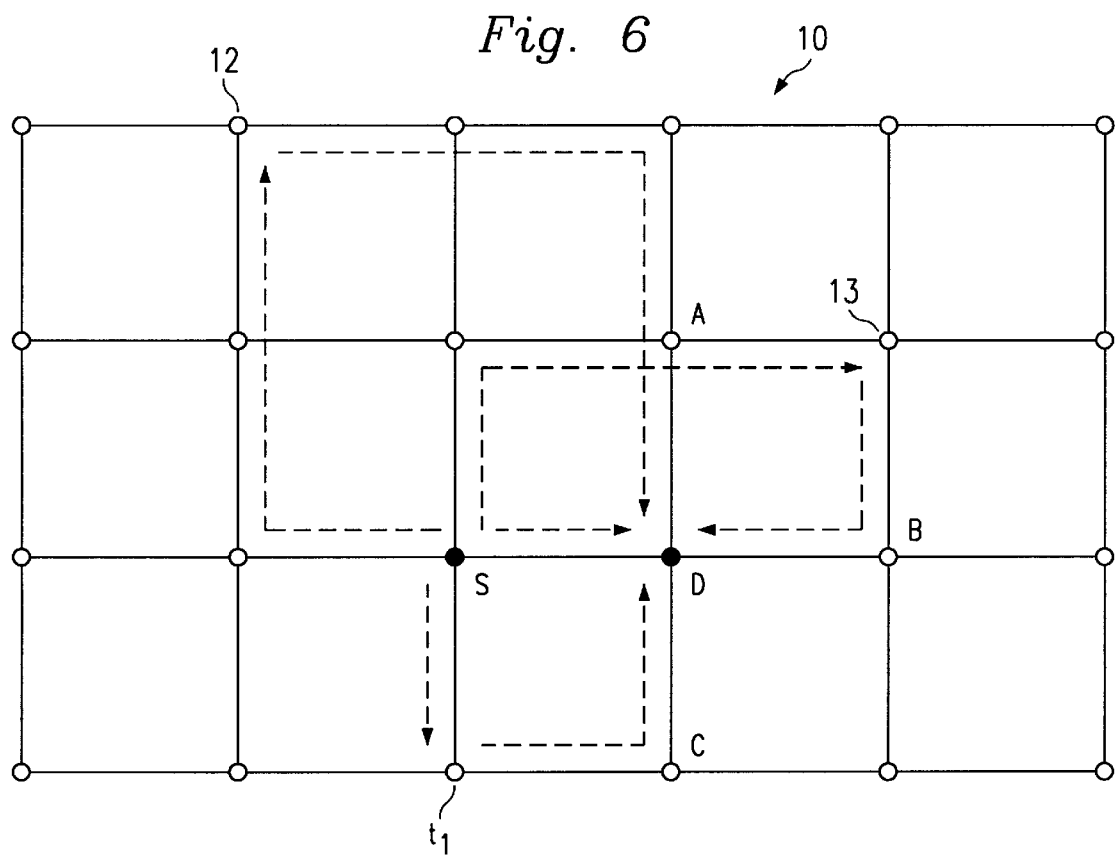
FIG. 6 depicts potential paths between two satellites via one or more intermediary satellites in accordance with one embodiment of the present disclosure.

Referring now to FIG. 6, a portion of a LEO satellite communication system 10 is shown, with S as the source satellite and D as the destination satellite. It is assumed, for illustration purpose, that communication traffic between S and D is substantially higher than that between any other two satellites in the vicinity. Due to hardware limitations, the direct communication link between S and D has a bandwidth limit. Accordingly, once the direct link has been saturated, any additional service request will be denied. For instance, assuming that five thousand (5000) wireless phone calls can be serviced between S and D through the direct link, then when the five thousand and first ($5001^{st}$) wireless phone user tries to make a call, a busy signal will be returned since the system will have saturated to its capacity. To alleviate this system problem, the first step is to select an intermediary satellite to take the call from S and then pass it on to D eventually, but through a different route avoiding the direct link. In a sense, this is a route randomization for packet delivery. For the sake of simplicity in FIG. 6, it is assumed that every satellite is connected to four others around it, i.e., D can directly communicate with A, B, and C in addition to the direct link between D and S. According to the present disclosure, an intermediary satellite is first selected and then an optimal route algorithm is used for finding an appropriate route between the source satellite and the intermediary satellite and the destination satellite. For example, if satellite t1 is selected as an intermediary satellite, the optimal route algorithm is then used to find an appropriate route between S and t1, and from t1 further to D. Each optimal route is one shortest path among many between two satellites. Accordingly, for a call from S to D, the link between S and t1 will first be active, then the link between t1 and C will be invoked, and finally, the call is routed from C to D. As an alternative, t2 or t3 can be similarly selected as a intermediary satellite and different paths can be formed to make the required communication connection. Dotted lines led by arrow heads in FIG. 6 illustrate those possible routes. In this manner, the traffic on the direct link between S and D will not be adversely affected, thus greatly reducing the likelihood of communication congestion between S and D. It should be noted that D only has a limited number of direct links to its neighbors, e.g., in this case, only four direct links. Eventually a call will be handled by any of those direct links to D. By randomly selecting the intermediary satellite, each data packet may travel a different route via a selected intermediary satellite. Even assuming that a same satellite neighboring to D will eventually be used, different data packets will arrive at the same satellite, e.g., A, B or C, with different time delays due to different routes they have traveled. Consequently, the traffic congestion on any direct link to D is advantageously avoided. This may also be viewed as a timing randomization for packet delivery. Timing randomization is a feasible implementation as long as the total time delay accrued on a specific route does not exceed the maximum delay permitted by a particular satellite system. Both route and timing randomizations are critical elements of the present disclosure for telecommunication information exchange within a satellite system.

In prior implementations, certain satellites in the system are commonly overly burdened due to the high demand for wireless services from their responsible regions, while at the same time, capacities of other satellites within the satellite system may not be utilized at all. The simplest example for this situation is a LEO satellite system with one satellite covering a populated metropolis while its neighboring satellites are only responsible for underpopulated rural areas. By implementing the present disclosure, both the route and timing randomization increase the use of unburdened satellites while reducing the load of a heavily overburdened satellite. Consequently, the efficiency of the entire satellite system is advantageously enhanced. As the satellite system on FIG. 6 illustrates, the communication capacity between S and D can be potentially increased, for example at least four fold, due to the application of above described routing method. That is, A, B and C provide additional capacity and can all be used for the inter-satellite communication between S and D.

Figure 7:
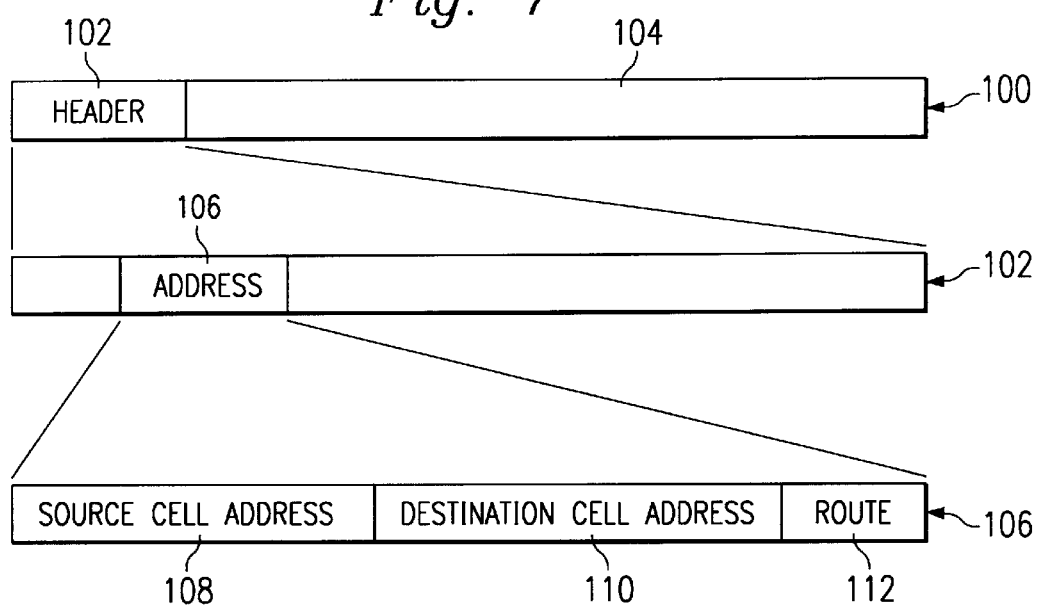
FIG. 7 presents a data structure within a header of a data packet according to an embodiment of the present disclosure.

In order to apply the above described method to randomize the route for a data packet to travel, it is important to have each packet store its route information so that each packet will arrive at an expected destination at a certain time. FIG. 7 is a detailed view of the data structure 100 in a typical data packet. At the top level of the data structure, a packet has a header segment 102 and another lengthy segment 104 for carrying data information. Inside the header segment, there is a segment 106 for address information. The existing data structure inside the address segment 106 has already contained information for source cell address 108, i.e., the source satellite, and destination cell address 110, i.e., the destination satellite. To implement the randomized route information according to the method of the present disclosure, a route segment 112 is included in addition to the source and destination information. The size of the route segment 112 is comparatively small. As discussed further herein, the method of the present disclosure encodes optimal route information using a small number of binary bits.

Figure 8:
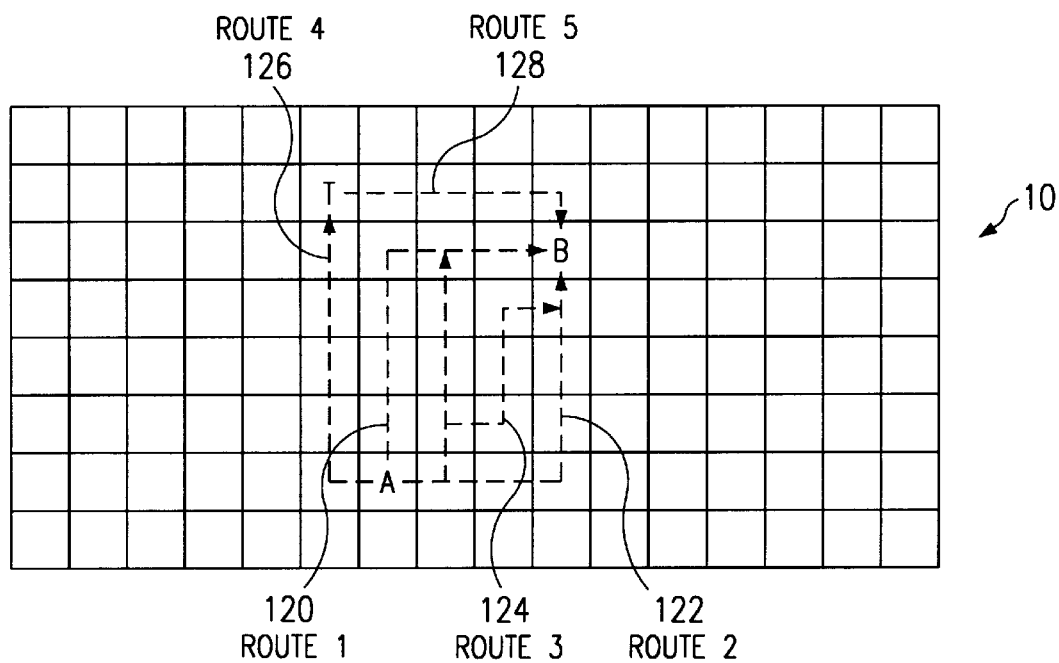
FIG. 8 illustrates a source satellite, an intermediary satellite, and a destination satellite having different optimal routes between any two of them in accordance with the embodiments of the present disclosure.

Turning now to FIG. 8, the method for determining an optimal route shall be discussed. Because of the hardware structure of the LEO satellite system, especially with the implementation of a virtual network, a shortest path between any two satellites can be easily determined. As shown in FIG. 8, one shortest path between satellite A and B is Route 1, as indicated by reference numeral 120. Route 1 includes from A, go north first, and then turn east toward B. Or as one alternative, Route 2, as indicated by reference numeral 122, includes from A go east first and turn north to B. There are other possible routes, such as Route 3, as indicated by reference numeral 124, that will have a smallest time delay, too. Due to this fact, there are generally two methods for easily routing the traffic. One is that after randomly selecting the intermediary satellite, e.g., T, the data packet can only travel west or east first, then north or south to either an intermediary satellite or thereafter from an intermediary satellite to a destination satellite. For example, Route 4, as indicated by reference numeral 126, can be taken first, and then Route 5, as indicated by reference numeral 128, next. If this first method is used, then the only information that needs to be stored in the route segment 112 is the location of the selected intermediary satellite. However, from the perspective of the entire satellite system, if more randomizations are used in selecting a given route, then more satellites of the system will likely be involved in packet transmission, and more efficient utilization of the entire system will result. Due to the existence of multiple shortest paths between any two satellites and in order to take advantage of the random selection of an optimal route, a preferred embodiment of the present disclosure allows for the data packets to travel with fewer directional restrictions, further as discussed herein below. Consequently, additional information is stored in the route segment 112 to inform the data packets how to travel.

Figure 9:
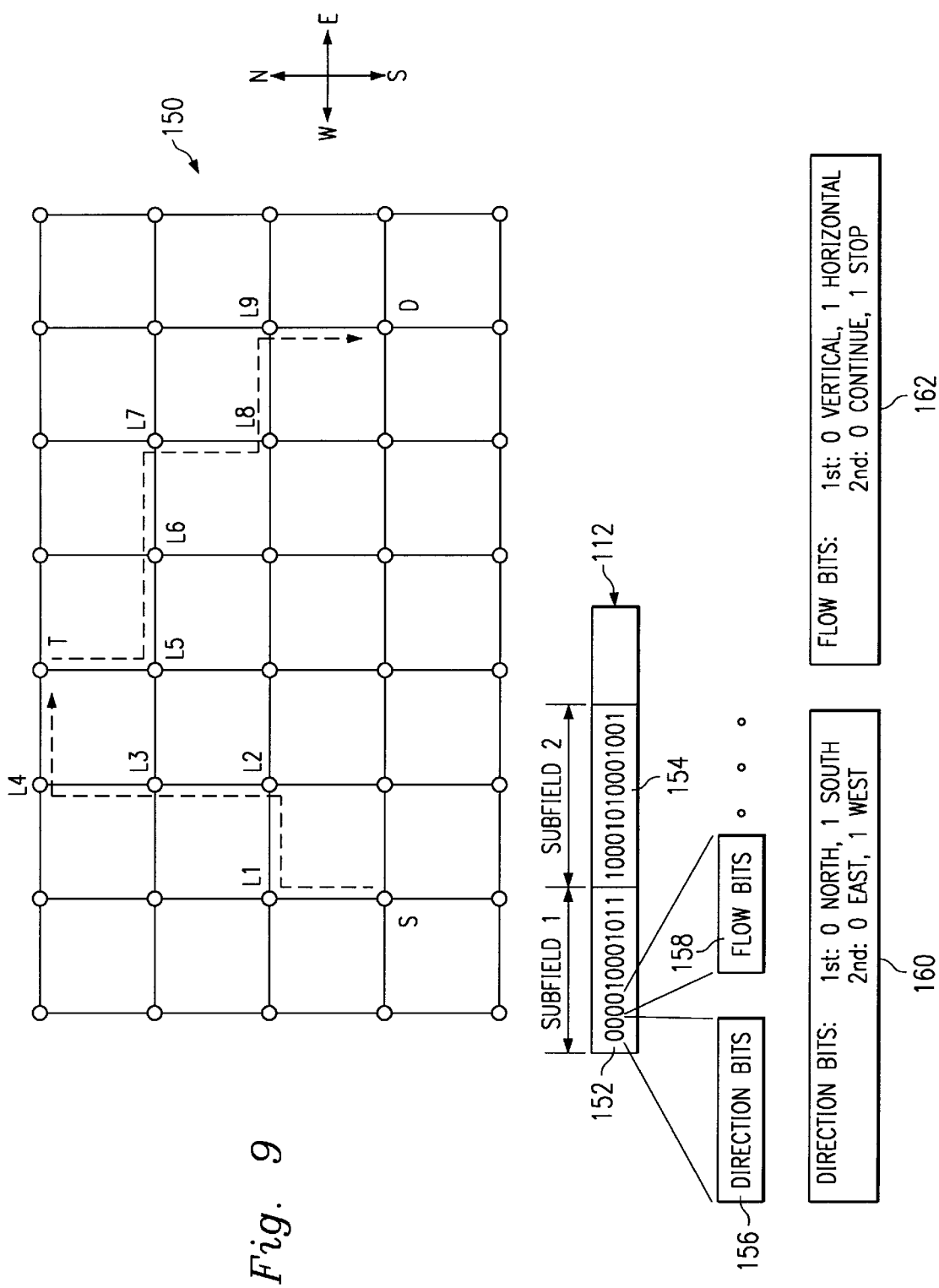
FIG. 9 illustrates the data structure of a route segment in the header of a packet representing the route information from a source satellite to a destination satellite through an intermediary satellite in accordance with the embodiments of the present disclosure.

FIG. 9 illustrates a detailed view of a route segment 112, containing route information for a packet to travel from a source satellite S to an intermediary satellite T and eventually to a destination satellite D. The route information contains the random selections of both an optimal route between S and T, and then that between T and D. A two-dimensional map 150 is also shown in FIG. 9 depicting a data packet's travel trace from the source satellite to the destination satellite. The route segment has two major subfields, including subfield 1, as indicated by reference numeral 152, for storing the route information between S and T, and subfield 2, as indicated by reference numeral 154, for storing route information between T and D. Information for inter-satellite links which a given packet travels through is encoded by a series of bit pairs, wherein the first bit pair of the series of bit pairs in a subfield includes two direction bits 156, and the remainder of bit pairs are all flow bit pairs 158. As illustrated in box 160, the first direction bit includes a zero (0) or a one (1) to denote north or south direction, respectively. Similarly, the second bit includes a zero (0) to denote east or a one (1) to denote west direction. Accordingly, a direction bit pair defines the relative position of the intermediary satellite with respect to the source satellite, or likewise, the relative position of the destination satellite with respect to the intermediary satellite. For instance, the first direction bit pair in the subfield 1 (152) is "00" which indicates that T is at a location northeast of S. As for the flow bits, as box 162 illustrates, the first bit of a respective flow bit pair informs the packet to go vertical or horizontal, and the second bit instructs the packet either to continue traveling or to stop. Accordingly, a "00" flow bit pair means going vertical and keep traveling on according to the instruction of the next bit pair. A "10" indicates that the link to travel to next is horizontal and that the targeted satellite has not yet been reached. When a "01" or "11" appears in the flow bit string, it instructs the packet to travel either vertically or horizontally for the next link, but stop right afterwards. Logically, subfield 1 ends or stops upon the occurrence of a "1" appearing in the second bit of a flow bit pair, indicating further that an intermediary satellite, such as T, has been reached. Immediately after subfield 1, subfield 2 includes a string of bit pairs, beginning first with a direction bit pair. The direction bits and flow bits are similarly interpreted as with respect to subfield 1. Accordingly, a "1" in the second bit of any flow bit pair of subfield 2 indicates that the packet has reached its final destination.

To complete a trip between any two satellites, the packet only needs to be informed one time about the relative position of the intermediary satellite with respect to the source satellite, and similarly, the destination satellite with respect to the intermediary satellite. The two direction bit pairs in subfield 1 and subfield 2 are where this information is encoded. Once an optimal route has been selected, a packet will not reverse its moving direction horizontally or vertically in the course of its travel. For example, if the direction bit pair is "01" for S to T, the packet is expected to travel only north for every "0" of the first bit of a flow bit pair, and only west for every "1" of the flow bit. It should not turn back to south or east at any time.

As an example, the bit string shown in FIG. 9 is:

"0000100010111000101000 1001"

which describes the route information for a packet to travel from S to D through a randomly selected intermediary satellite T. The first bit pair "00" indicates that T is at location northeast of S, and the second bit pair "00" instructs the packet to travel north to L1, and sequentially, "10" to L2, "00" to L3, "00" to L4, and "11" to travel east to T and stop. The second half of the string starts with "10" to indicate that the destination satellite, D, is at a south east corner from T. From T, the packet travels south for the first "00" to L5, two links east for two consecutive "10"s to L7 through L6, another step to L8 because of "00", and one more link east to L9 for "10", and eventually it reaches D by the last south bound move for "01".

With reference now to FIG. 10, a flow diagram is shown which illustrates a method for determining an appropriate intermediary satellite and randomly selecting an optimal route. A mathematical notation system is first derived and installed. Assume S, T, and D denote a source satellite, an intermediary satellite, and a destination satellite, respectively. A pair of coordinates (hDist, vDist) denote the position of D relative to S, and the pair of coordinates (hHops, vHops) denote the position of T, relative to S. The absolute value of hDist can be defined as the number of inter-satellite links, or hops, that have to be made. Furthermore, if the value of hDist is positive, then it means that D is |hDist| hops east of S, and, if the value of hDist is negative, then D is west of S by the same distance. Similarly, a positive value of vDist means that D is |vDist| hops north of S, and a negative value of vDist means D is |vDist| hops south of S. Further, dist is defined to be the number of total hops, between S and D. In other words, dist can be expressed by the following:

$$dist=|hDist|+|vDist|.$$

Secondly, a function sign(x) is defined to denote the sign of a variable such as hDist and vDist. If x>0, then sign(x)=1, if x<0, then sign(x)=−1, and if x=0, sign(x) can be either 1 or −1, which may be randomly decided each time by the satellite system. In order to conform to a given system hardware limitation, there must be a limit for a total number of hops. The maximum number of hops is therefore defined as hopLimit.

Referring still to FIG. 10, the first step, denoted as Step 300 in the flow chart, includes computing the number of spare hops, denoted as spareHops. Spare hops are a given number of hops allowed in addition to the minimum number of hops between S and D. An intermediary satellite T is selected according to such a requirement that for a packet traveling through it from S to D would require no more hops than the satellite system can tolerate, i.e. the hopLimit. Therefore, it must be determined as to how many hops can be added to include an intermediary satellite. Thus spareHops=(hopLimit−dist)/2. Once spareHops is determined, Step 310 randomly selects a number called realSpareHops, which is between 0 and spareHops, to decide how many actual hops are to be made by a data packet. Step 320 further randomly selects a number called hSpareHops, which is between 0 and realSpareHops, to denote the number of horizontal hops. Naturally, the number of vertical hops, vSpareHops, can only be the difference of realSpareHops and hSpareHops. Step 330 determines the horizontal coordinate of T. If hdist=0, then a hRand is randomly selected so that hRand is larger than 0, but smaller than |hSpareHops|, and let hHops=sign(hDist)×hRand. If hDist>0, then hHops is randomly determined by selecting one of the following values:

$$hHops=sign(hDist)\times(hSpareHops+|hDist|)$$

or $$hHops=-sign(hDist)\times hSpareHops.$$

By the same token, in Step 340, vHops, the vertical coordinate of T, is determined in a similar manner. If vDist=0, vRand is selected, and vHops=sign(vDist)×vRand. If vDist>0, then vHops is either $$vHops=sign(vDist)\times(vSpareHops+|vDist|)$$

or $$vHops=-sign(vDist)\times vSpareHops.$$

Once both hHops and vHops are determined by the above method, a valid T is located. Step 350 includes encoding the route information into binary bit pairs. The signs of hHops and vHops tell the relative direction of T to S (where 0 is treated as a positive number). The two direction bits are thus determined. Subsequently, there will be hHops+vHops number of flow bit pairs to indicate the travel route from S to T. The second bits of all the bit pairs, except the last pair, are set to 0, and logically, the second bit of the last bit pair is set to 1 to indicate that T is reached. Then any random arrangement of all the first bits of the flow bit pairs renders a route between S and T. At this point, the information for subfield 1 is fully encoded. In Step 360, D's position relative to T is determined, and its coordinates are (hDist−hHops, vDist−vHops). Similar to Step 350, Step 370 encodes the route information for subfield 2. After all the route information is encoded, any remaining digits in the route segment are assigned or filled with zero (0) as noted by, Step 380.

The size of the route segment is extremely small in comparison to the size of a routing table currently used in the LEO satellite system. In general, for a LEO satellite system in which k number of inter-satellite links are permitted by the hardware, and since the method and system of the present disclosure uses two (2) binary bits to denote each link and two direction bits each for subfield 1 and subfield 2, the total length of the route segment can be calculated by the formula below:

$$Length=2\times K+4$$

in which k is the maximum number of links, and the number 4 represents four bits of direction information. As an example, for a satellite system allowing 16 links, route information can be stored using only ((2×16)+4)=36 bits, and as a convention in the art, a total of 64 ($2^{16}$) bits, can be implemented as the route segment. Therefore, for a particular LEO system, only a small number of bits are needed for the route segment to provide enough information for a packet to travel from S to T, and then to D. In one embodiment, the route segment includes a fixed length (e.g., 64 bits) long enough to accommodate all route information. As an alternative, the route segment can have an additional header segment of its own to store information about a varying length of a total route segment.

Lastly, a typical LEO satellite communication system usually includes ground stations to compile information for data packets to carry. Accordingly, the ground stations have the processing capability for, according to the method described herein, making the selection of an intermediary satellite, choosing the optimal routes, and encoding the route information to the data packets before the data packets are transmitted to satellites in the orbit. Alternatively, the source satellite can also process the needed information for the packets. In addition, the ground stations can impose other conditions when choosing an optimal path. If a certain route is already congested, and if a randomization of the flow bits produces the same route, the ground station could reject the result and find another randomized route instead.

While the invention has been particularly shown and described with reference to the preferred embodiment thereof, it will be understood by those skilled in the art that various changes in form and detail may be made therein without departing from the spirit and scope of the invention, as set forth in the following claims. needed for the route segment to provide enough information for a packet to travel from S to T, and then to D. In one embodiment, the route segment includes a fixed length (e.g., 64 bits) long enough to accommodate all route information. As an alternative, the route segment can have an additional header segment of its own to store information about a varying length of a total route segment.

Lastly, a typical LEO satellite communication system usually includes ground stations to compile information for data packets to carry. Accordingly, the ground stations have the processing capability for, according to the method described herein, making the selection of an intermediary satellite, choosing the optimal routes, and encoding the route information to the data packets before the data packets are transmitted to satellites in the orbit. Alternatively, the source satellite can also process the needed information for the packets. In addition, the ground stations can impose other conditions when choosing an optimal path. If a certain route is already congested, and if a randomization of the flow bits produces the same route, the ground station could reject the result and find another randomized route instead.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. In a Low Earth Orbit satellite communication system using data packets traveling among satellite units and ground stations for information exchange, a method of implementing an optimal route for the data packets to travel from a source satellite to a destination satellite, said method comprising the steps of:

selectively choosing an intermediary satellite at a ground station;

calculating a plurality of shortest paths between the source satellite to the intermediary satellite at the ground station;

calculating a plurality of shortest paths between the intermediary satellite to the destination satellite at the ground station;

selecting an optimal route from the calculated shortest paths between the source satellite to the intermediary satellite at the ground station;

selecting an optimal route from the calculating shortest paths between the intermediary satellite to the destination satellite at the ground station;

encoding route information according to the selected optimal routes from the source satellite to the destination satellite via the intermediary satellite into the data packets at the ground station; and transmitting the data packets with the encoded route information to the source satellite, wherein the data packets travel from the source satellite to the destination satellite according to the encoded route information.

2. The method of claim 1, wherein the transmission of the data packets from the source satellite to the destination satellite shall not accrue a total time delay exceeding a maximum allowable time delay.

3. The method of claim 1, wherein an optimal route is a selected shortest path between any two satellites for the data packets to travel to achieve a high system efficiency for the Low Earth Orbit satellite communication system.

4. The method of claim 1, wherein a data packet includes a header segment, the header segment having a route information segment therein.

5. The header segment of claim 4, wherein the route information segment includes a series of binary numbers.

6. The header segment of claim 4, further wherein the route information segment includes a second header segment, the second header segment indicating a length of the route information segment.

7. The header segment of claim 4, wherein the route information segment includes route information encoded as a series of binary bits of a prescribed length denoting travel directions for the data packets.

8. In a Low Earth Orbit satellite communication system using data packets traveling among satellites and ground stations for information exchange, a method of implementing an optimal route for the data packets to travel from a source satellite to a destination satellite, said method comprising the steps of:

calculating the optimal route for the data packets to travel from the source satellite to the destination satellite; and encoding route information for the optimal route directly into the data packets.

9. The method of claim 8, wherein said step of calculating the optimal route further includes the steps of:

selectively choosing an appropriate intermediary satellite for enhancing the overall efficiency of said communication system;

determining an optimal route for said data packets to travel from said source satellite to said intermediary satellite; and determining an optimal route for said data packets to travel from said intermediary satellite to said destination satellite.

10. The method of claim 8, wherein said step of calculating an optimal route is done by the ground stations.

11. The method of claim 8, wherein said step of encoding route information is carried out by a ground station.

12. The method of claim 8, further includes the step of delivering the data packets from the source satellite to the destination satellite via the optimal route.

13. The method of claim 8, further includes the step of delivering the data packets through a plurality of selected intermediary satellites from the source satellite to the destination satellite.

14. The method of claim 8, whereas a data packet includes a header segment containing the encoded route information.

15. The header segment of claim 14, wherein the encoded route information includes a series of binary bits.

16. The header segment of claim 14, wherein the encoded route information is of a prescribed length.

17. The header segment of claim 14, wherein the encoded route information has a varying length.

18. In a low earth orbit satellite communication system using data packets traveling among satellites and ground stations for information exchange, a method of implementing a most optimal route for the data packets to travel from a source satellite to a destination satellite, said method comprising the steps of:

determining the optimal route by selectively choosing an intermediary satellite at a ground station;

encoding route information from the source satellite to the destination satellite via the intermediary satellite into the data packets at the ground station; and delivering the data packets from the source satellite to the destination satellite according to the encoded route information.

19. The method of claim 18, wherein said step of determining the optimal route includes selecting the intermediary satellite as a function of an enhancement of overall efficiency of the communication system.

20. The method of claim 18, wherein said step of determining the optimal route further includes the steps of:

selecting a first shortest path between the source satellite to the intermediary satellite so as to minimize traffic congestion between the source satellite and the intermediary satellite; and selecting a second shortest path between the intermediary satellite to the destination satellite so as to minimize traffic congestion between the intermediary satellite and the destination satellite.

21. The method of claim 18, wherein said step of encoding route information includes utilizing a series of binary bits of a predetermined length, the series of binary bits occupying a segment of the data structure of a data packet.

22. The binary bits of claim 21, wherein the segment of the data structure is a header segment of a data packet.

23. The method of claim 18, wherein said step of encoding route information includes utilizing a series of binary bits of a varying length, the series of binary bits occupying a segment of the data structure of a data packet.

24. The binary bits of claim 23, wherein the segment of the data structure is a header segment of a data packet.

25. An efficient Low Earth Orbit satellite communication system having data packets as a means for information exchange, the data packets traveling among telecommunication hardware means through a most optimal route, said system comprising:

a first telecommunication hardware means for initiating a request to transfer data;

a first ground station for determining an optimal route for the data packets to travel and encoding route information for the optimal route into the data packets;

a source satellite for transmitting said data packets;

a destination satellite for receiving and further transmit the data packets;

a second ground station for receiving the data packets from the destination satellite; and a second telecommunication hardware means for receiving the transferred data initiated by the first telecommunication hardware means from the second ground station.

26. The system of claim 25, wherein the first telecommunication means is a wireless telephone.

27. The system of claim 25, wherein the first ground station calculates a plurality of potential paths that would not result in an impermissible overall time delay for the data packets to travel.

28. The system of claim 25, wherein the first ground station further selectively chooses an appropriate intermediary satellite for determining the optimal route in order to enhance the overall efficiency of the satellite communication system.

29. The first ground station of claim 28, further wherein the first ground station determines an optimal route for the data packets to travel from the source satellite to the intermediary satellite.

30. The first ground station of claim 28, further wherein the first ground station determines an optimal route for the data packets to travel from the intermediary satellite to the destination satellite.

31. The first ground station of claim 28, wherein the first ground station determines an optimal route for the data packets to travel from the source satellite to the destination satellite via a plurality of intermediary satellites.

32. In a low earth orbit satellite communication system using data packets traveling among satellites and ground stations for information exchange, a system of implementing a most optimal route for the data packets to travel from a source satellite to a destination satellite, said system comprising:

a ground station for determining the optimal route and encoding route information from the source satellite to the destination satellite;

at least one data packet encoded with the route information; and a plurality of satellites for receiving and transmitting the data packets according to the encoded route information.

33. The system of claim 32, wherein said ground station further selects an intermediary satellite as a function of an enhancement of overall efficiency of the communication system.

34. The system of claim 32, wherein said ground station further selects a first shortest path between the source satellite to the intermediary satellite so as to minimize traffic congestion between the source satellite and the intermediary satellite.

35. The system of claim 32, wherein said ground station further selects a second shortest path between the intermediary satellite to the destination satellite so as to minimize traffic congestion between the intermediary satellite and the destination satellite.

36. The system of claim 32, wherein said data packets encoded with route information includes a series of binary bits of a predetermined length, the series of binary bits occupying a segment of the data structure of said data packets.

37. The binary bits of claim 36, wherein the segment of the data structure is a header segment of a data packet.

38. The system of claim 32, wherein said data packets encoded with route information includes a series of binary bits of a varying length, the series of binary bits occupying a segment of the data structure of a data packet.

39. The binary bits of claim 38, wherein the segment of the data structure is a header segment of a data packet.

* * * * *